United States Patent
Dayan et al.

(10) Patent No.: US 7,464,250 B2
(45) Date of Patent: Dec. 9, 2008

(54) METHOD TO REDUCE DISK ACCESS TIME DURING PREDICTABLE LOADING SEQUENCES

(75) Inventors: Richard Alan Dayan, Raleigh, NC (US); James Franklin Macon, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 10/798,091

(22) Filed: Mar. 11, 2004

(65) Prior Publication Data

US 2005/0204095 A1    Sep. 15, 2005

(51) Int. Cl.
*G06F 9/06*    (2006.01)

(52) U.S. Cl. .................. 711/217; 711/112; 711/173; 711/213; 711/218

(58) Field of Classification Search .......... 711/112–113, 711/173, 213, 217–218; 714/6–7
See application file for complete search history.

(56) References Cited

U.S. PATENT DOCUMENTS

| | | | |
|---|---|---|---|
| 5,247,653 A * | 9/1993 | Hung | 703/13 |
| 5,568,641 A | 10/1996 | Nelson et al. | |
| 5,758,050 A * | 5/1998 | Brady et al. | 714/1 |
| 5,974,503 A * | 10/1999 | Venkatesh et al. | 711/114 |
| 6,308,264 B1 | 10/2001 | Rickey | |
| 6,453,383 B1 | 9/2002 | Stoddard et al. | |
| 6,560,701 B1 | 5/2003 | Berstis et al. | |
| 6,633,968 B2 * | 10/2003 | Zwiegincew et al. | 711/213 |
| 6,920,533 B2 * | 7/2005 | Coulson et al. | 711/145 |
| 2002/0196467 A1 * | 12/2002 | Delhoune et al. | 358/1.18 |
| 2003/0074550 A1 | 4/2003 | Wilks et al. | |
| 2003/0088650 A1 | 5/2003 | Fassold et al. | |
| 2003/0149837 A1 * | 8/2003 | Coker et al. | 711/113 |
| 2003/0200290 A1 * | 10/2003 | Zimmerman et al. | 709/222 |
| 2004/0225874 A1 * | 11/2004 | Burr et al. | 713/1 |
| 2004/0260909 A1 * | 12/2004 | Lee et al. | 711/213 |

* cited by examiner

*Primary Examiner*—Matt Kim
*Assistant Examiner*—Hetul Patel
(74) *Attorney, Agent, or Firm*—H. Artoush Ohanian; Cynthia S. Byrd; Biggers & Ohanian, LLP

(57) ABSTRACT

The invention discloses a method for loading data from a disk. The method may comprise comparing a current sequence of disk requests to data indicative of a previous disk request sequence. Responsive to detecting a match between the current disk sequence and the previous disk I/O sequence, a copy of data blocks accessed during the current disk sequence may be stored in a contiguous portion of the disk. Responsive to a subsequent request for data in the disk sequence, the request may be mapped to and serviced from the sequential portion of the disk: The continuous portion of the disk to which the data is copied may be on a different partition of the disk than a disk partition on which the original data is stored. A sequence of disk accesses may be recorded. Responsive to retrieving data from the continuous portion, additional data from the contiguous portion of the disk may be prefetched and may be cached in a buffer. Responsive to an I/O request, it may be determined whether the requested data resides in the buffer, and if so, the data from the buffer may be retrieved without accessing the hard disk. In an exemplary embodiment, the disk sequence may represent a boot sequence of the system.

1 Claim, 4 Drawing Sheets

METHOD TO REDUCE DISK ACCESS TIME DURING PREDICTABLE LOADING SEQUENCES

BACKGROUND

1. Field of the Present Invention

The present invention is related to the field of data processing devices and specifically to data processing devices that employ fixed disk storage.

2. History of Related Art

Microprocessor-based data processing systems are composed of several subsystems or major components. Three of these subsystems that have the most affect on system performance are the central processing unit (CPU), the system memory, and the file subsystem. Of these three, however, the fixed disk storage used by the file subsystem has the most significant impact on system performance. The predominance of the fixed disk unit's affect on system response time is due to the presence of electro-mechanical elements in the fixed disk unit. Whereas semiconductor processors and memory have no moving parts and operate at speeds determined by the speed of electrons moving through an impedance element, disk units are characterized by mechanical latencies caused by rotation of the media and/or movement of the head (i.e., seek times). Latencies associated with disk accessed time can be reduced by using a disk cache. Like its cache counterpart in the context of system memory hierarchies, a disk cache is a relatively small, fast, and expensive storage medium into which recently retrieved data from the disk can be stored in anticipation of the data being required in the near future. For disk sectors that are accessed frequently, disk caches can yield significant performance benefits.

Unfortunately, a disk cache can only be useful after it is populated with data. When a system is first powered on or reset, the disk cache is empty. Thus, the great majority of data accesses that occur following a restart can only be fulfilled from the fixed disk. This problem might be acceptable if relatively few disk accesses were needed following restart. In reality however, the system restart of most data processing systems, including all x86-based data processing systems that run a Windows® platform, execute a large number of disk requests following restart. These disk requests are needed to retrieve portions of increasingly complex operating systems from disk and store them into memory. Files on disks are typically allocated sequentially when they are installed. When accessed (data files) or executed (program files), it is relatively rare that an entire file is used. During a boot sequence, for example, large portions of software such as the operating system's help files are not accessed. In addition, during boot sequencing, a reference to an entity in one file frequently invokes another file that may reside on a portion of the disk storage that is physically distant from the calling program. For at least these reasons, the boot sequence is characterized by frequent accesses to disk storage where there is substantially no relationship between the data requested in each access. In contexts other than system boot sequencing, it may be common to detect a disk access sequence that is repetitive. In such cases, it would be desirable if the repeated nature of the requests could be recognized by creating an entirely sequential (contiguous) copy of the requested data and a mapping from the original data sequence of the relocated data sequence such that, during a subsequent access to this data, the requested data would lie in a contiguous portion of the disk.

SUMMARY OF THE INVENTION

Generally, the present invention is concerned with improving data processing system performance by reducing the amount of time a system consumes accessing its fixed disk storage. The invention is most applicable to sequences or patterns of fixed disk access that occur repetitively and predictably. The data processing system includes a fixed disk controller that is enabled to monitor and record disk accesses (i.e., to monitor and record what tracks and sectors are requested). When the disk controller detects a sequence that has previously occurred one or more times, the disk controller is configured to copy the various disk segments comprising the sequence into sequential space in a dedicated portion of the disk. If the data in the sequence is accessed later, the disk controller reroutes the requests into the relocated portion of the disk, where the data is stored sequentially. Since the data is stored sequentially in the dedicated portion, the disk spends less time moving the disk head among disk portions that are randomly spaced on the disk. Moreover, since the relocated data is sequential, the disk controller can employ and greatly benefit from pre-fetching data into a disk cache, either on the disk controller or elsewhere.

In particular, the invention discloses a method for loading data from a disk. The method may comprise comparing a current sequence of disk requests to data indicative of a previous disk request sequence, Responsive to detecting a match between the current disk sequence and the previous disk sequence, a copy of data block accessed during the current disk sequence may be stored in a contiguous portion of the disk. Responsive to a subsequent request for data in the disk sequence, the request may be mapped to and serviced from the sequential portion of the disk. The contiguous portion of the disk to which the data is copied may be on a different partition of the disk than a disk partition on which the original data is stored. A sequence of disk accesses may be recorded. Responsive to retrieving data from the contiguous portion, additional data from the contiguous portion of the disk may be prefetched and may be cached in a buffer. Responsive to an I/O request, it may be determined whether the requested data resides in the buffer, and if so, the data from the buffer may be retrieved without accessing the hard disk.

In an exemplary embodiment, the invention may be applied to a system boot sequence, where the disk access sequence is likely to follow a pattern. In other exemplary embodiments, the invention may be implemented in conjunction with post-boot disk access sequences, such as the sequence that is followed when an application program is loaded.

BRIEF DESCRIPTION OF THE DRAWINGS

Other purposes and advantages of the invention will become apparent upon reading the following detailed description and upon reference to the accompanying drawings in which.

Figure 1:
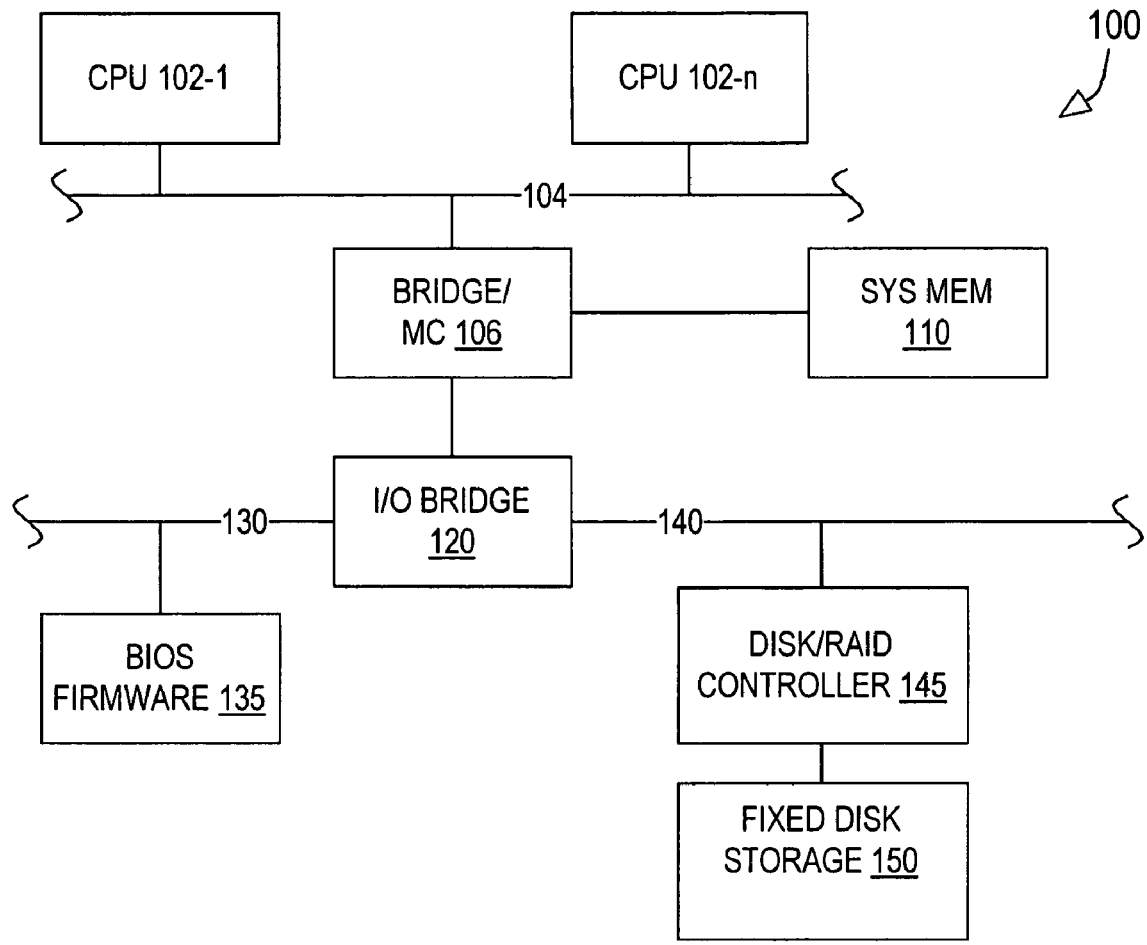
FIG. 1 is a block diagram of selected elements of a data processing system suitable for implementing the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 is a simplified block diagram of a data processing system 100 suitable for use in conjunction with one embodiment of the present invention. In the depicted embodiment, system 100 includes one or more central processing units (CPU's) 102-1 through 102-$n$ (collectively or generically referred to herein as CPU(s) 102). CPU(s) 102 share a system bus 104 that provides access to a system memory 110 via a bridge/memory controller 106. An I/O bridge 120 connected to memory controller bridge 106 provides connections to a first I/O bus 130 and a second I/O bus 140. In the depicted embodiment, the system's basic I/O system (BIOS) firmware is stored on a nonvolatile storage device such as a flash memory device represented by reference numeral 135. First I/O bus may be a conventional expansion bus such as the Industry Standard Architecture (ISA) bus or a variant thereof. In other implementations, first I/O bus 130 is a low pin count (LPC) bus.

The second I/O bus 140 is likely an industry standard peripheral bus such as the Peripheral Components Interface (PCI) bus. As depicted in FIG. 1, a controller 145 connected to second I/O bus 140 is connected to fixed disk storage 150. Controller 145 may be implemented as a single disk controller or as a Redundant Array of Inexpensive Disks (RAID) controller in an embodiment where fixed disk storage 150 represents a RAID array. RAID is a well known technique for providing redundancy in fixed disk storage.

When a data processing system such as system 100 is first booted, system memory 110 and any CPU cache memory (not depicted) contain no data because they are volatile storage elements that lose their data content when a system is powered off or reset. To transition from a state in which there is no program code stored in its volatile storage, system 100 must execute code stored in nonvolatile memory.

The code that is first executed following a power on or system reset is commonly referred to as the boot code. The boot code is primarily responsible for performing certain critical functions including establishing the BIOS, performing a basic self test (referred to as the power on self test (POST)), and loading an operating system that can then assume control of the system's operation. Because the volatile storage elements are "empty" following reset and because the firmware device 135 likely has severely limited storage capacity, the bulk of the code that is fetched during the boot sequence (such as the operating system code that must be loaded into memory) is retrieved from fixed disk storage 150. Retrieving data from fixed disk storage is notoriously slow compared to retrieving data stored in other storage elements such as system memory 110. Fixed disk 150 is characterized by mechanical and electromechanical elements that must be operated to retrieve data from the disk. Most significantly, the disks read/write head must be positioned over the appropriate track and sector of the appropriate disk before the data can be accessed. If data from two physically disparate portions of the disk are accessed in close chronological succession, performance will be impacted negatively by the time required to rotate the disk from the first portion of the disk to a second portion and move the read heads.

In at least some applications of significance in terms of the frequency of occurrence or in the amount of data that they retrieve, the data access pattern associated with certain events does not vary significantly from one execution to another. Among these applications, perhaps the most recognizable is the boot sequence itself. The boot sequence of many data processing systems does not vary in any substantial way from one power on or reset event to the next. In addition, the boot sequence is likely to involve many accesses to fixed disk storage and there is no necessary relationship between the data accessed during the boot sequence and the data's position on the disk. Thus, the boot sequence may invoke a sequence of disk access to data portions that may be widely scattered over the physical disk thereby rendering the boot sequence highly inefficient in terms of access time. The present invention addresses this problem by recognizing and recording a disk access sequence, such as the disk access sequence that occurs during the boot sequence. When a sequence is determined to be a sequence that has been repeated in the past (i.e., the sequence has a signature), the disk controller copies or relocates the data that was accessed during the sequence into sequential storage on a dedicated portion of the fixed disk. This relocated data is then used during subsequent occurrences of the disk access sequence.

Portions of the invention may be implemented as a set or sequence of computer executable instructions (software) that is stored on a computer readable medium such as a magnetic disk or tape, a CD ROM, a flash memory or other electrically alterable medium. During times when the instructions are being executed by a CPU, portions of the software may reside in system memory or a cache memory of the CPU.

Figure 2:
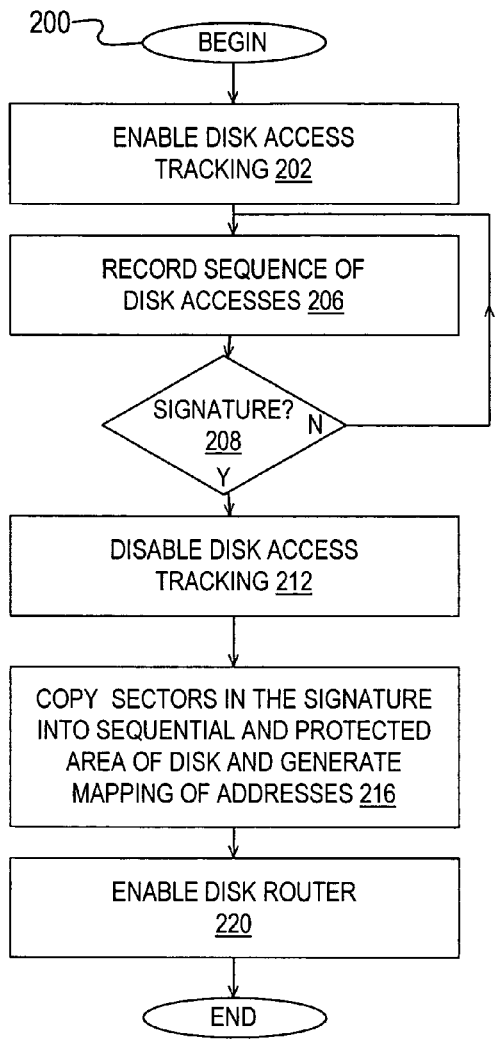
FIG. 2 is a flow diagram of a method of recording, detecting, and copying a predictable disk access sequence according to an embodiment of the present invention.

Referring now to FIG. 2, a flow diagram illustrating a method 200 of monitoring disk accesses patterns or sequences for a characteristic signature is depicted. In the depicted embodiment, a disk access tracking mode is enabled (block 202) as an initial step in the data relocation process. In one embodiment, the system's disk controller 145 is primarily responsible for tracking disk accesses patterns. In such embodiments, disk controller 145 has a configurable "record" mode during which I/O accesses to fixed disk 150 are recorded in storage (not depicted) on disk controller 145. Disk controller 145 preferably includes some random access memory (RAM) storage capacity to store disk access sequences. When disk controller 145 is in a record mode, each I/O request to fixed disk storage 150 is recorded. The record information includes, at a minimum, the head, track, and sector number of the data requested. The disk access information is recorded in the same order as the disk access requests themselves. In this way, disk controller 145 builds a sequential table of disk access data representing the sequence of I/O requests that are made to fixed disk storage 150.

Recording of disk access requires some processing overhead on the part of disk controller 145 and some storage capacity to store the recorded sequences. In many applications, disk controller processing bandwidth and disk controller storage are in short supply. In such cases, it is desirable to implement disc controller 145 with a record switch that may be toggled under software control so that disk I/O requests are not recorded all of the time, but instead, only when desired by the user or administrator. As indicated previously, a primary candidate for recording disk access sequences is the sequence of disk accesses that occur immediately following system power on or reset until the time when an operating system is loaded and has control of the system. Because this code sequence is the first code sequence to execute following reset, one embodiment of the invention employs a disk controller 145 having a record "switch" that is always on at power up. In this embodiment, the disk controller is capable of recording from the as soon as the system is powered on.

With disk access tracking enabled in block 202, the disk controller then begins to record (block 206) the sequence of access to fixed disk storage 150. Disk controller 145 may include or allocate dedicated storage for storing disk access sequences. Depending upon the amount of information stored with each disk access request, the amount of storage required for this task varies widely. In an embodiment designed to minimize the amount of storage required to store a sequence of I/O accesses, a minimum of information is stored for each disk access request. In this context, a minimum of information would likely include the physical address (head, track, sector, etc) of the first sector accessed with the I/O request and the amount of data requested.

At some point, due to lack of storage, the performance impact of recording, or some other concern, it may be desirable to disable disk access recording. Disk controller 145 according to at least one embodiment of the invention includes a switch (software or otherwise) that disables I/O access recording. Knowing when to stop recording using the switch may be more difficult than knowing when to start it. As mentioned above, starting the recording is achieved by default following system boot or through manipulation by the system administrator or other person. Knowing when to disable recording, however, is complicated by the fact that an operating system, as such, never completes executing. Operating systems in one sense are monitoring programs that remain active as long as the system is active. Because the operating system never really turns off, it is difficult to tell the system in any way that is meaningful when to stop recording.

In the context of an initial boot sequence, turning off I/O access recording is likely to occur when the operating system is loaded. This point in time or sequence may be detected by, for example, monitoring for the first user input that is received or monitoring for a lapse of time exceeding a specified threshold that passes without any user input or I/O access requests.

As illustrated in FIG. 2, disk controller 145 monitors for a disk access signature (i.e., a sequence that it has recorded on a previous occasion). Until at least one sequence of disk access is stored disk controller 145, the controller cannot recognize another sequence as a matching sequence. Thus, disk controller 145 must record and store at least one sequence of I/O requests for comparison with subsequent disk access sequences. In one embodiment, the system boot sequence is the first sequence that is recorded and stored for comparison with a subsequent sequence. When checking for a matching sequence in block 208, disk controller 145 may place limits on the amount or quantity of code that must match before the code sequence is recognized as a signature to prevent very short sequences of disk accesses that match from being interpreted as a signature.

If a disk access sequence is recognized (block 208) as matching a signature that the disk controller has seen in the past, the disc controller will disable (block 212) disk access recording or tracking and initiate (block 216) a "relocation" process in which the disk sectors that were accessed during the sequence recognized as matching a signature are copied from their original disk locations into dedicated portion of the fixed disk referred to herein as the disk's signature partition.

Figure 4:
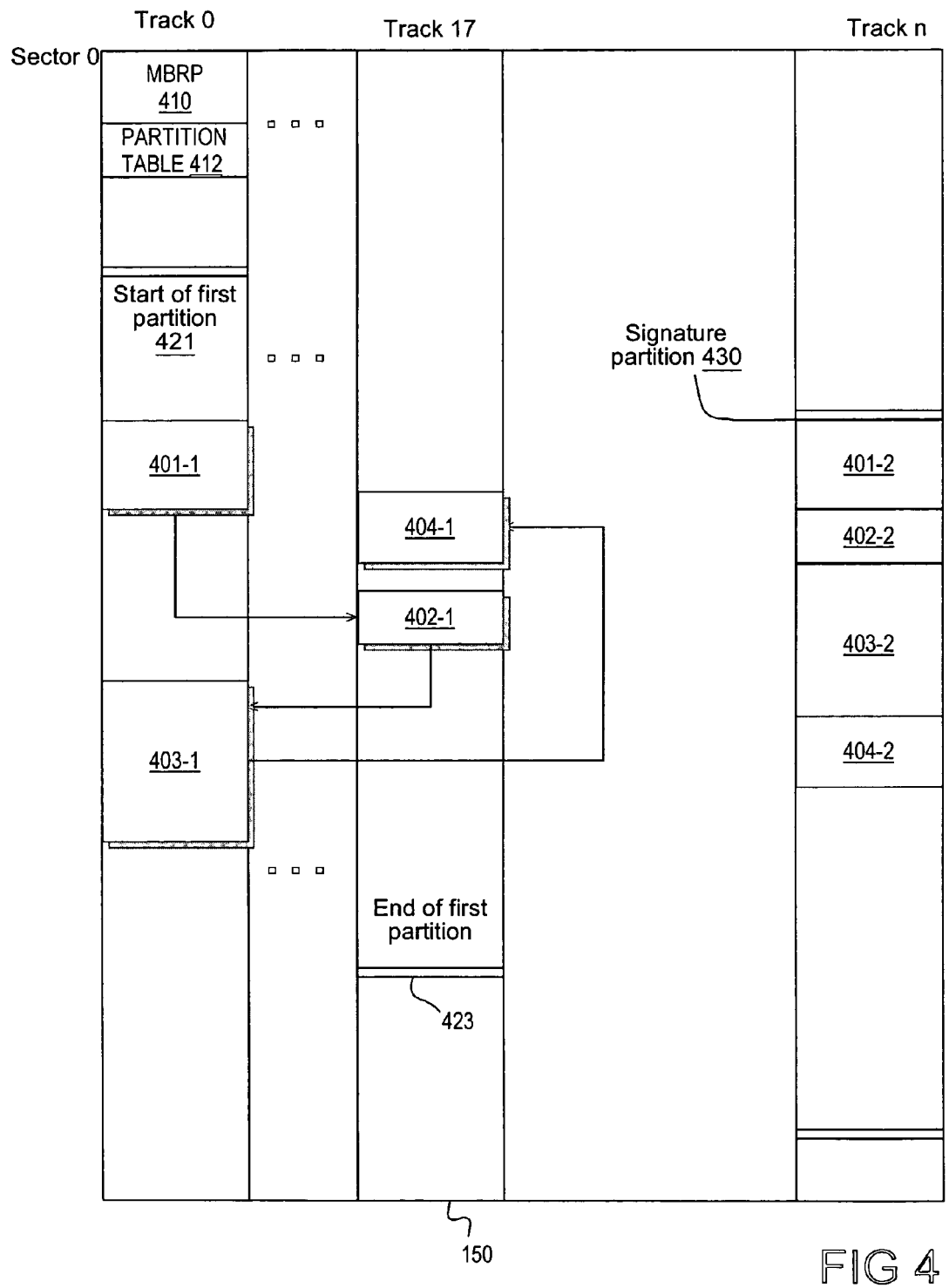
FIG. 4 is a conceptual representation of fixed disk storage configuration according to an embodiment of the present invention.

Referring momentarily to FIG. 4, a conceptual representation of an implementation of a fixed disk storage area according to one embodiment of the present invention is depicted. In the depicted embodiment, fixed disk storage 150 is allocated into different partitions. At the root sector (track 0, sector 0), a master boot record (MBR) program 410 uses a partition table 412 to determine where the partitions are and to determine which partition is the active partition. Partition table 412 defines the physical partitioning of disk 150. In the illustrated implementation, a first partition 421, which typically begins in track 0 and includes all contiguous disk space up to the end of partition indicator 423 in Track 1. In a likely implementation, first partition 421 is associated with a particular operating system. When the MBRP 410 executes and recognizes first partition 421 as the active partition, it invokes a boot record on first partition 421 that performs the process of loading into memory the operating system that is resident on first partition 421. This loading process is illustrated in FIG. 4 by a set of disk blocks 401-1 through 404-1. As the boot record on first partition 421 executes, the disk segments represented as 401-1 through 404-1 are loaded into memory in a chronologically sequential manner. It is noted from FIG. 4 that the different blocks retrieved during the boot sequence may be located on different tracks, distant sectors, and so forth. It will be appreciated by those skilled in the operation of fixed disk drives that the sequential retrieval of blocks 401-1 through 404-1 will includes a significant amount of delay as the disk read/write elements are rotated and otherwise positioned over the respective segments.

According to the present invention, however, the sequence of accesses to disks 401-1 through 404-1 is monitored and recorded. When the sequence is subsequently encountered (on the next system boot for example), the system will recognize the sequence as defining a signature and relocate the blocks in the signature to a sequential area of the disk identified as signature partition 430. Although the depicted embodiment elects to store the relocated data into a different partition than the partition in which the original data resides, other embodiments may use portions of first partition 421 to store any signature(s) associated with that partition.

Returning to FIG. 2, disk controller 145, after relocating data from its original location to the signature partition 430 (or other sequential area of the disk) maintains a mapping between the original data's disk addresses and the relocated data's disk addresses. By maintaining a mapping from the data original location to its location within signature partition 430, the invention enables subsequent accesses to the original data to be "routed" to the signature partition 430. In block 220 of FIG. 2, this routing functionality is enabled after all (or at least a portion) of data that was determined to be a part of the signature is relocated to the signature partition 430.

The flow diagram of FIG. 2 illustrates the method of detecting a signature and relocating the data to a sequential segment of the fixed disk storage. After the routing functionality of disk controller 145 is enabled, disk accesses are performed according to the method 300 of the flow diagram of FIG. 3. Specifically, disk controller 145 monitors (block 302) all disk I/O requests once its router functionality is enabled. When an I/O request is detected in block 304, the disk controller determines (block 308) whether the requested disk sector is in the signature. The disk controller can make this determination by comparing the requested disk sector to those sectors defined in its routing information.

If the requested segment is determined (block 312) by the disk controller to be a disk sector that is stored in the signature partition, the disk controller will invoke its router functionality to retrieve the data from the sequential partition. One of the advantages of storing data sequentially in the order that it is accessed chronologically is that doing so greatly improves opportunities for prefetching data. Prefetching refers to a technique used to reduce delays by anticipating (guessing) what data will next be needed from a disk and placing this data in the disk controllers disk cache, which is typically just a RAM array. The benefit to having the data arranged sequentially in signature partition 430 is that prefetching data is likely to prefetch data that will soon be used.

Figure 3:
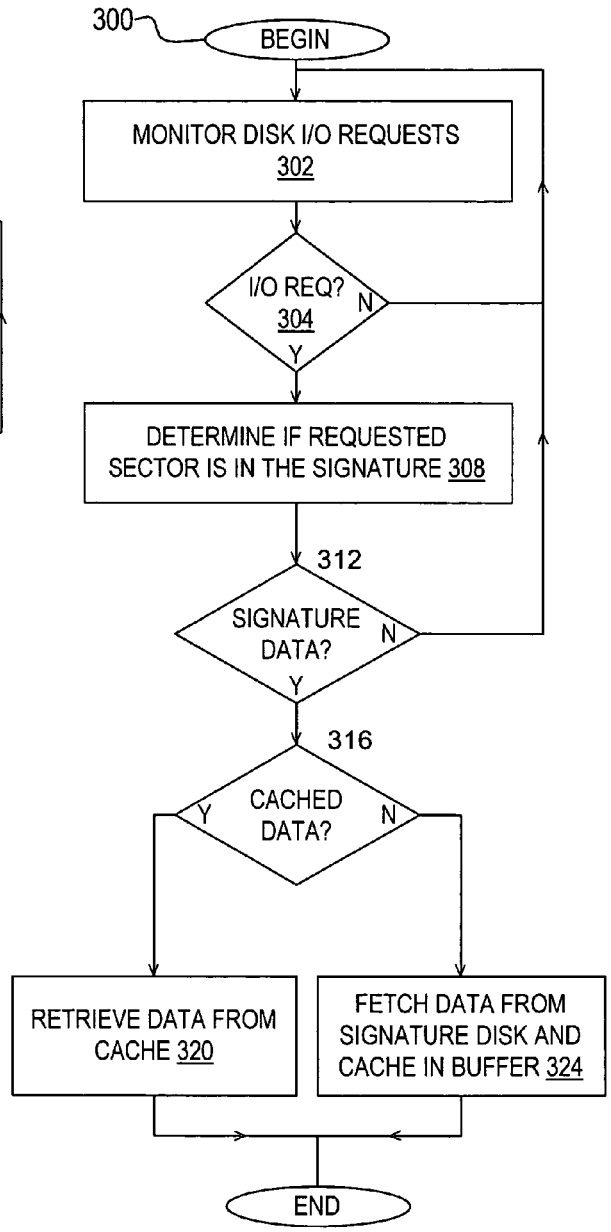
FIG. 3 is a flow diagram of a method of monitoring I/O requests and servicing the request from relocated data according to an embodiment of the present invention.

With prefetching enabled, the embodiment of method 300 depicted in FIG. 3 includes determining not only whether the requested data is in the signature partition, but also determining (block 316) whether the requested data is in a disk cache of disk controller 145. If the data is in a disk cache, disk controller 145 retrieves (block 320) the requested data from the disk cache thereby saving significant access time. If the data is not currently in the disk cache, the disk controller will fetch (block 324) the data from the signature partition and cache the data in a disk cache (also referred to as a buffer) of fixed disk 150.

Figure 5:
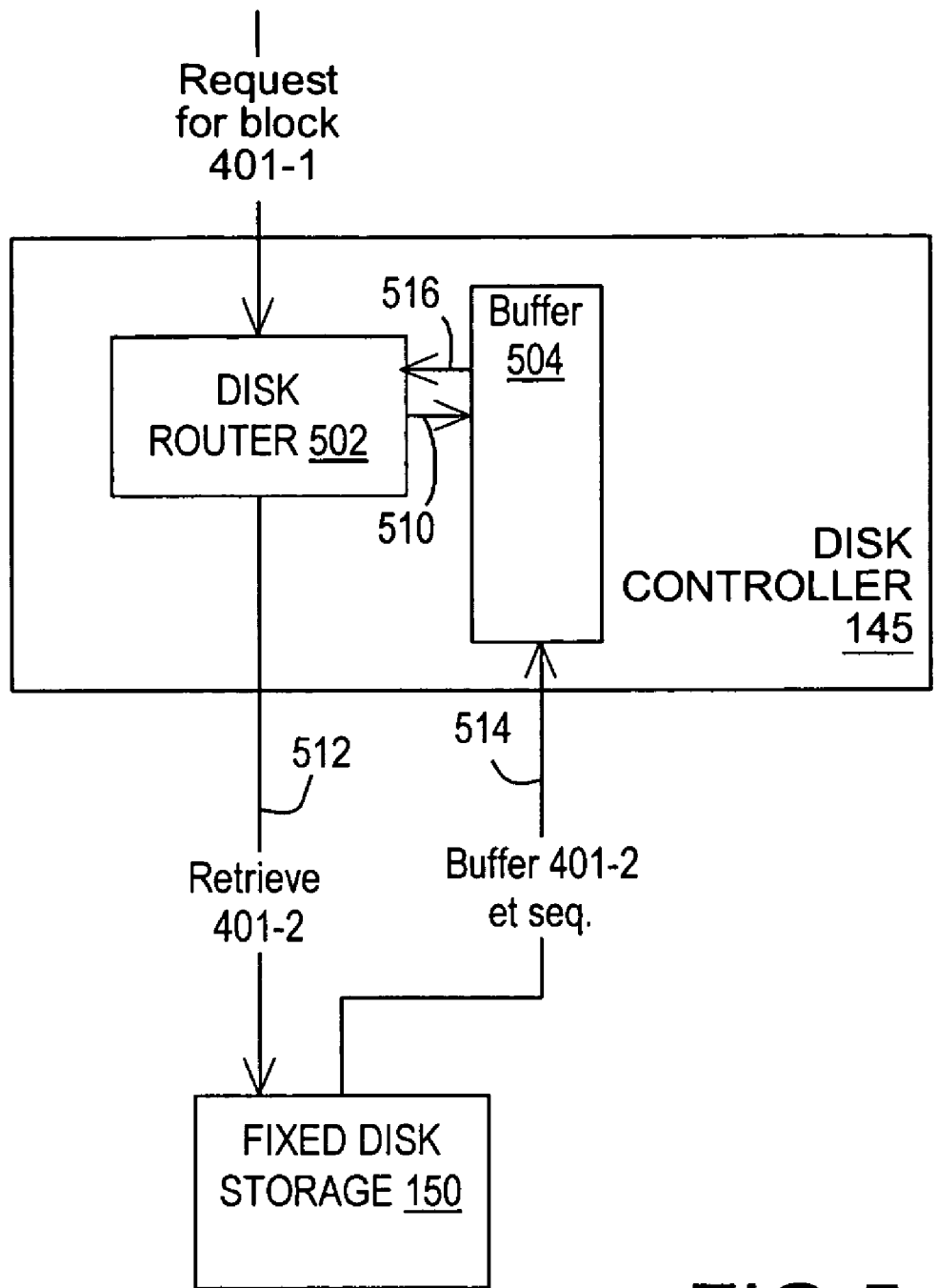
FIG. 5 is a block diagram of selected elements of a disk controller according to an embodiment of the present invention.

Referring now to FIG. 5, selected elements of disk controller 145 according to one embodiment of the present invention are depicted to illustrate the routing functionality described above. Disk controller 145 according to the depicted embodiment includes a disk router 502 and a disk cache (buffer) 504. When disk controller 145 receive an I/O request, such as the depicted request for data block 401-1, it consults a mapping (not depicted) within router 502 to determine if the requested block is part of the signature partition. If the request is for a relocated data block (i.e., a data block that has been copied into signature block 430), router 502 consults or accesses (510) a disk cache or buffer 504 to determine if the data is currently stored in the buffer 504. If disk cache 504 informs (516) disk router 502 that the requested data "missed" in the disk cache (i.e., the requested data block is not valid in disk cache 504), router 502 will request (512) fixed disk storage 150 for the relocated data block 401-2. In the depicted embodiment, disk controller 145 will, in addition to requesting relocated data block 401-2, which is currently needed, also request a prefetch of data block following block 401-2 (i.e. 402-2 and so forth). Fixed disk storage 150 then returns (514) the requested data block and any prefetched blocks to disk cache 504. By prefetching additional data when block 401-2 is retrieved, the disk controller 145 tries to improve the amount of time spent accessing those subsequent blocks. Thus, if a request for data 401-2 follows the request for data block 401-1, the router 502 will map the request into a request for data block 401-2, which will be served from the disk cache buffer 504 rather than from the disk directly thereby reducing the access time. Even in cases where the requested data is not found in buffer 504 due to its limited size, the request will be serviced from the signature partition 430. Because the signature data is stored sequentially in the signature partition, the data can be accessed faster due to the close physical proximity of all the data in the signature partition.

It will be apparent to those skilled in the art having the benefit of this disclosure that the present invention contemplates a method for arranging the fixed disk to improve the performance during a sustained fixed disk access sequence. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of loading data from disk in a data processing system, comprising:

comparing a current sequence of disk requests to data indicative of a previous sequence of disk requests, wherein the sequence of disk requests includes the sequence of disk requests following a power-on event;

responsive to detecting a match between the current sequence and the previous sequence, storing a copy of data blocks accessed during the current sequence in a contiguous portion of the disk, wherein storing a copy of data blocks accessed during the I/O sequence comprises storing the data blocks sequentially in the order that the data blocks were accessed chronologically; and responsive to a subsequent request for data in the disk sequence, mapping the request to the sequential portion of the disk and servicing the request from data in the sequential portion;

wherein the contiguous portion of the disk to which the data is copied is on a different partition of the disk than a disk partition on which the original data is stored;

recording a sequence of disk accesses, wherein recording the sequence includes recording the disk address of each block accessed and the length of each block;

responsive to retrieving data from the contiguous portion, prefetching additional data from the contiguous portion of the disk and caching the additional data in a buffer; and responsive to an I/O request, determining whether the data requested resides in the buffer and, if so, retrieving the data from the buffering without accessing the hard disk.

* * * * *